United States Patent
Lindberg et al.

(10) Patent No.: US 6,607,394 B2
(45) Date of Patent: Aug. 19, 2003

(54) HOT-PLUGGABLE ELECTRONIC COMPONENT CONNECTION

(75) Inventors: Lars Lindberg, Stockholm (SE); Mikael Wickstrom, Jüfälla (SE); Bertil Kronlund, Sollentuna (SE)

(73) Assignee: Optillion AB, Stockholm (SE)

( * ) Notice: Subject to any disclaimer, the term of this patent is extended or adjusted under 35 U.S.C. 154(b) by 0 days.

(21) Appl. No.: 09/778,322

(22) Filed: Feb. 6, 2001

(65) Prior Publication Data

US 2002/0106926 A1 Aug. 8, 2002

(51) Int. Cl.$^7$ ................................................. H01R 13/62
(52) U.S. Cl. ...................... 439/326; 439/324; 439/924.1
(58) Field of Search ............................ 439/324, 924.1, 439/326

(56) References Cited

U.S. PATENT DOCUMENTS

| | | | | |
|---|---|---|---|---|
| 4,509,099 A | * | 4/1985 | Takamatsu et al. | 361/413 |
| 5,261,826 A | * | 11/1993 | Leeb et al. | 439/67 |
| 5,709,555 A | * | 1/1998 | Noschese | 439/79 |
| 5,816,838 A | * | 10/1998 | Del Prete et al. | 439/326 |
| 6,030,233 A | * | 2/2000 | Kamiyamane | 439/65 |
| 6,056,573 A | * | 5/2000 | Nishioka | 439/326 |
| 6,064,218 A | * | 5/2000 | Godfrey et al. | 324/762 |
| 6,142,802 A | * | 11/2000 | Berg et al. | 439/180 |
| 6,176,724 B1 | * | 1/2001 | Klatt et al. | 439/326 |
| 6,220,873 B1 | * | 4/2001 | Samela et al. | 439/76.1 |
| 6,325,552 B1 | * | 12/2001 | Brillhart | 385/88 |

* cited by examiner

*Primary Examiner*—Michael C. Zarroli
(74) *Attorney, Agent, or Firm*—Coudert Brothers LLP

(57) ABSTRACT

The present invention provides a method and apparatus for hot-pluggable electronic component connection. In one embodiment of the present invention, ground and power line couplings with a system are formed by moving the component in one direction while signal line couplings with the system are formed by moving the component in another direction. In one embodiment, a guide rail system causes a hot-pluggable component to move in a direction which couples, first, the ground line and, then, the power lines to the system. After the ground and power lines are connected, the guide rail system causes the component to move in another direction which couples the signal lines to the system. In another embodiment, a latching mechanism holds the component in place once the signal lines are coupled to the system. In this embodiment, an ejection system releases the latching mechanism and allows removal of the component. In one embodiment of the present invention, signal lines are coupled to the system in the same plane as a PCB. In this embodiment, the area used for signal line couplings is increased when more signal lines are present. Thus, signal lines are added without increasing space requirement of the component or decreasing the fault tolerance of signal line couplings. In one embodiment of the present invention, the component is an optical transceiver. In one embodiment, connections are made using an anisotropic conductive elastomer. In one embodiment, a ground pattern is etched into the component and the PCB circumscribing the signal line connections.

48 Claims, 17 Drawing Sheets

HOT-PLUGGABLE ELECTRONIC COMPONENT CONNECTION

BACKGROUND OF THE INVENTION

1. Field of the Invention

The present invention relates to the field of electronic components, and in particular to a method and apparatus for hot-pluggable electronic component connection.

2. Background Art

In some electronic systems, it is desirable to connect and disconnect components (e.g., an optical transceiver) without turning off the electronic system. An electronic component which can be connected to an electronic system without turning off the electronic system is termed "hot-pluggable" or "hot-swappable." Hot-pluggable components have multiple connection lines which connect to the electronic system. These lines must be connected and disconnected in a specific order. Additionally, hot-pluggable devices must be accessible only from the front for maintenance and reconfiguration. Thus, it should be easy for a human to remove a hot-pluggable device. In prior art methods, connection lines are all on the same side of a component. These methods are expensive, inefficient and not easily accessible. These problems can be better understood by a review of hot-pluggable components.

Front Hot-Pluggable Components

During insertion of a hot-pluggable device, the circuits of the device are protected by a protection scheme. Some prior protection schemes have severe limitations for high performance devices which make reliable, robust operation difficult or costly to achieve. A level of protection may be designed into the device's input/output signal lines to protect against the effects of the electric transients that occur during insertion of a hot-pluggable device.

Protection is more complicated when a device contains internal data storage such as internal registers (e.g., implemented by Random Access Memory, RAM, with device internal battery backup), particularly when the data is essential to the function of the device. During device initialization (start-up) operation or during a controlled shutdown, an uncontrolled hot-insertion or hot-removal might change the data in the data storage. When the accidentally and randomly changed data is interpreted by the device at a later time, a malfunction or erroneous behavior occurs. However, robustness is improved by using a mechanical line connection sequencing.

Hot-pluggable components have three types of connection lines: a ground line, power lines, and signal lines. When a hot-pluggable component is connected to a system, the ground line must connect to the system first followed by the power lines. After the ground and power lines are connected to the system, the signal lines are connected to the system. The component is, then, recognized by the system and initializes itself properly.

FIG. 1 illustrates the process of connecting a hot-pluggable component to a system. At step 100, the ground line is connected to the system. At step 110, the power lines are connected to the system. At step 120, the signal lines are connected to the system.

When disconnecting a hot-pluggable component, the lines are disconnected in the reverse order they were connected. First, the signal lines disconnect, followed by the power lines. Finally, the ground line disconnects and disconnection is complete. The order of line connection and disconnection is an important factor in ensuring that the component and electronic system are not damaged by connecting or disconnecting hot-pluggable components without turning the system off.

FIG. 2 illustrates the process of disconnecting a hot-pluggable component from a system. At step 200, the signal lines are disconnected from the system. At step 210, the power lines are disconnected from the system. At step 220, the ground line is disconnected from the system.

FIG. 3 illustrates a prior art hot-pluggable component. The component (300) has connection pins for the ground line (310), the power lines (320) and the signal lines (330). Theses connection pins are inserted into a system connector (340) typically attached to a printed circuit board (PCB) (350) already coupled to the system such that a line is connected to the system when its connection pin contacts the system connector.

The connection pin for the ground line is longer than any other pin. Thus, the ground line will connect before all other lines during connection. Likewise, the ground line will disconnect before all other lines during disconnection. Similarly, the connection pins for the power lines are longer than the connection pins for the signal lines. Thus, the power lines will connect before the signal lines during connection and disconnect before the signal lines during disconnection.

However, when the component is connected by moving the component in a direction parallel with the surface of the PCB connecting the connector to the system, a strong mechanical sheer force parallel with the surface of the PCB is applied on the soldering between the system connector and the PCB. Thus, repeated connections and disconnections could cause the system connector to disconnect from the PCB. Additionally, space on such connectors is limited. Thus, increasing the amount of signal lines requires that the area of the connection for each line be reduced. Reducing the area for each connector reduces the entire connector's fault tolerance level since all connections must line up more precisely.

In some prior art methods, high performance single and multiple electrical connectors are placed at the rear side or on the bottom of the hot-pluggable device. By increasing the width of the connector, room is made available for more electrical lines. Use of arrays also allow more signal lines to be used. However, a wide, multiple line connector poses several problems. Industry equipment practice minimizes the width and height of hot-pluggable devices. The addition of multiple parallel lines to the connector to accommodate higher device frequency requirements unacceptably increases the height or width of the hot-pluggable device. Thus, the scalability of prior art methods for increased number of multiple lines is limited. The mating part of the connector on the circuit board causes a long signal path inside the connector where high frequency impedance matching is needed. The high frequency impedance matching typically results in a bulky and expensive connector and signal degradation. Additionally, since the signal leaves and enters the device at the opposite ends of the optics in the device, the signal path cannot be optimized.

FIG. 4 illustrates an additional problem with prior art methods. The component (400) is positioned parallel to the PCB (410) of the system and the signal lines (420) of the component are attached to the connector (430) of the PCB. However, a gap (440) exists between the PCB and the component. The signal traveling between the system and the component must traverse this gap. A larger gap results in an increase in the amount of time required to propagate a signal and a degradation of the signal. Thus, large gaps reduce the component's efficiency. Additionally, it is necessary to shield the lines carrying the signal through the gap to reduce error caused by electromagnetic interference. The shielding increases the size and cost of the connector.

SUMMARY OF THE INVENTION

The present invention provides a method and apparatus for hot-pluggable electronic component connection. In one embodiment of the present invention, ground and power line couplings with a system are formed by moving the component in one direction while signal line couplings with the system are formed by moving the component in another direction.

In one embodiment, a guide rail system causes a hot-pluggable component to move in a direction which couples, first, the ground line and, then, the power lines to the system. After the ground and power lines are connected, the guide rail system causes the hot-pluggable component to move in another direction which couples the signal lines to the system. In another embodiment, a latching mechanism holds the component in place once the signal lines are coupled to the system. In this embodiment, an ejection system releases the latching mechanism and allows removal of the component.

In one embodiment of the present invention, signal lines are coupled to the system in the same plane as a PCB. In this embodiment, the area used for signal line couplings is increased when more signal lines are present. This increases scalability in two dimensions for the addition of signal lines. Thus, signal lines are added without sacrificing industry practice space requirements of the component or decreasing the fault tolerance of signal line couplings. In one embodiment of the present invention, the front hot-pluggable component is an optical transceiver.

In one embodiment, connections are made using a conductive interposer. The interposer (e.g., anisotropic conductive elastomer) minimizes the signal path. In one embodiment, a ground pattern is etched into the component and the PCB circumscribing the signal line connections. This embodiment minimizes electromagnetic interference without increasing the dimensions of the component or the connector.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Embodiments of the present invention are for hot-pluggable electronic component connections. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Multi-Direction Connection

Figure 5:
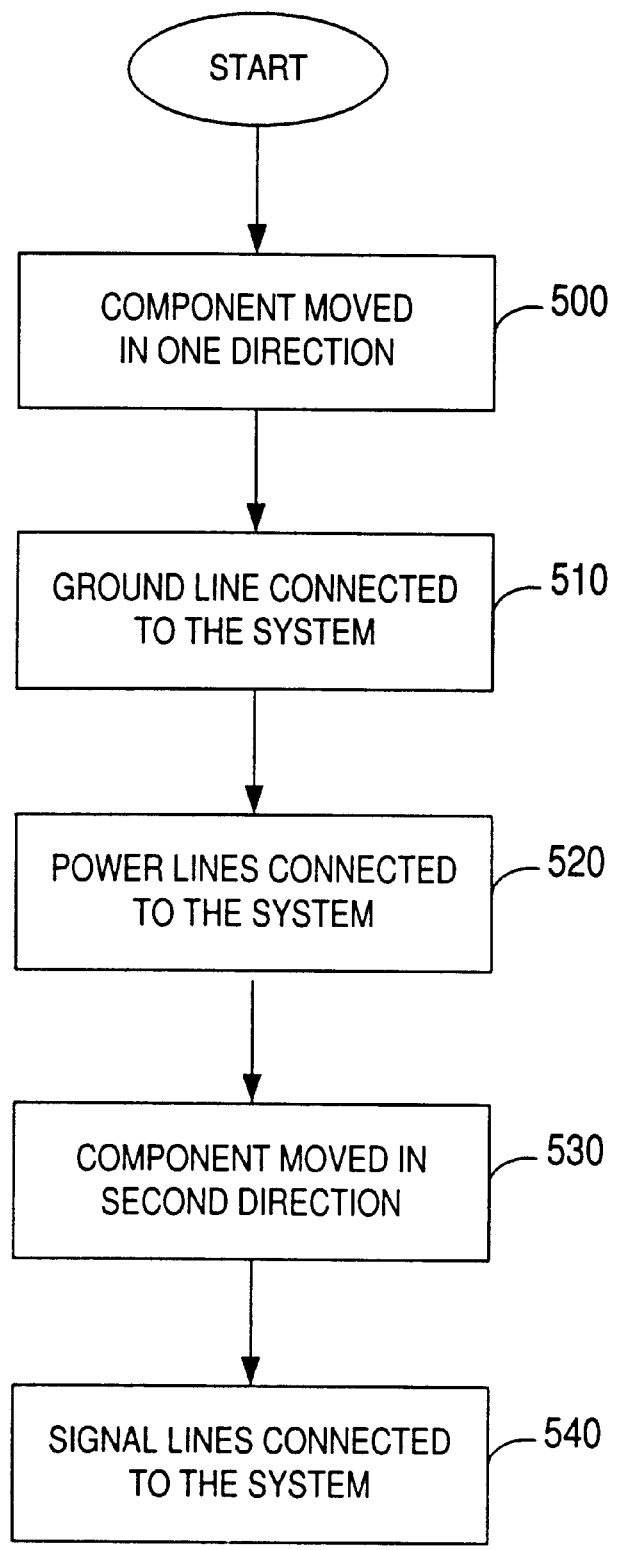
FIG. 5 is a flow diagram of the process of connecting a hot-pluggable component in accordance with one embodiment of the present invention.

In one embodiment of the present invention, ground and power line connections to a system are formed by moving the component in one direction while signal line connections to the system are formed by moving the component in another direction. FIG. 5 illustrates the process of connecting a hot-pluggable component in accordance with one embodiment of the present invention. At step 500, the component is moved in one direction. At step 510, the ground line is connected to the system. At step 520, the power lines are connected to the system. At step 530, the component is moved in a second direction. At step 540, the signal lines are connected to the system.

Multi-Direction Disconnection

Figure 6:
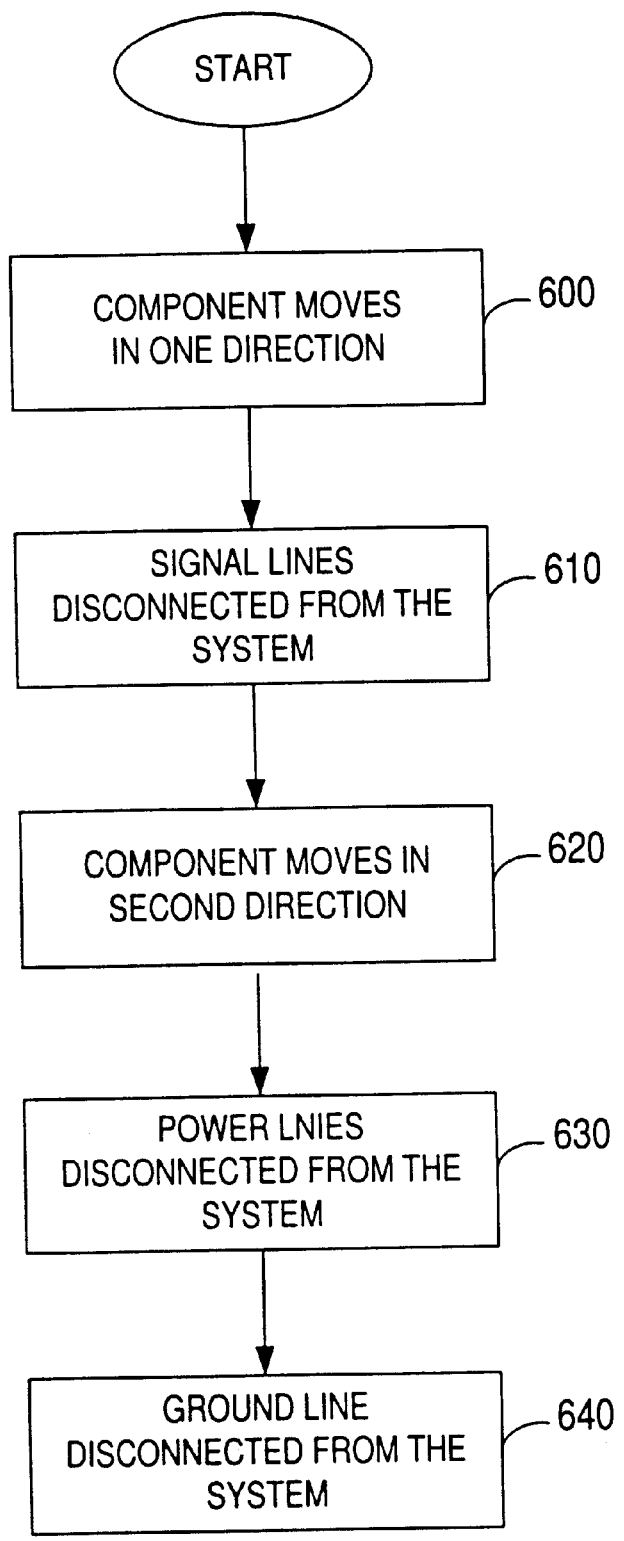
FIG. 6 is a flow diagram of the process of disconnection a hot-pluggable component in accordance with one embodiment of the present invention.

FIG. 6 illustrates the process of disconnection a hot-pluggable component in accordance with one embodiment of the present invention. At step 600, the component is moved in one direction. At step 610, the signal lines are disconnected from the system. At step 620, the component is moved in a second direction. At step 630, the power lines are disconnected from the system. At step 640, the ground line is disconnected from the system.

Figure 7:
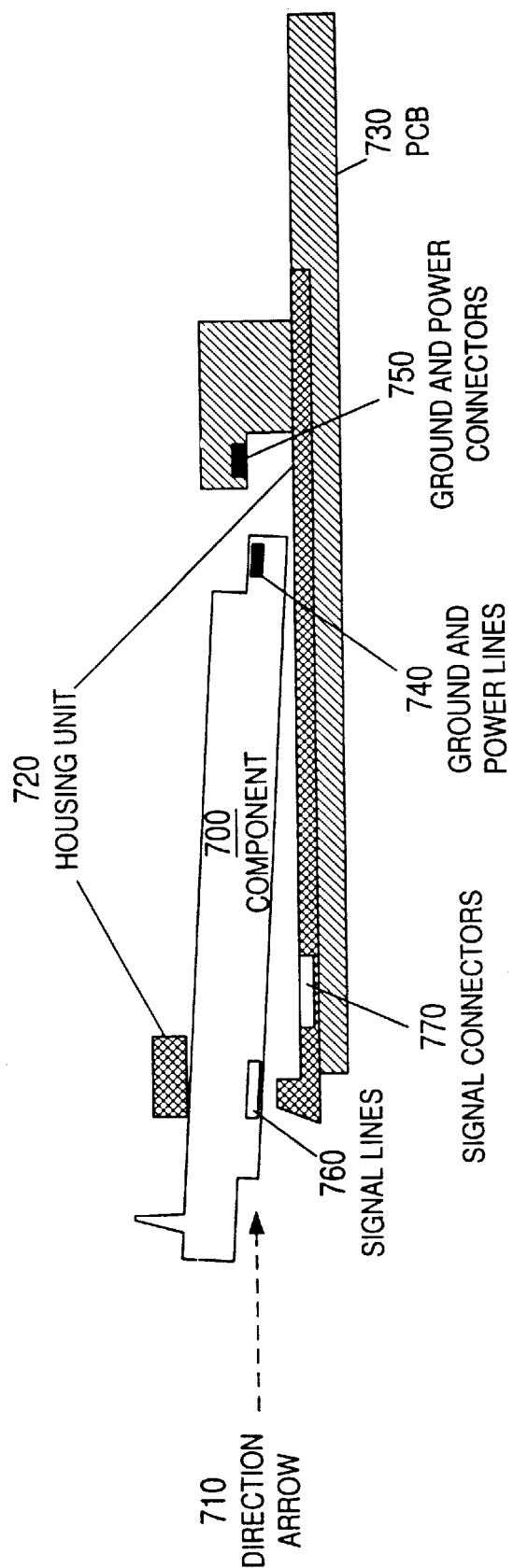
FIG. 7 is a block diagram of a hot-pluggable component during the process of connection with a system in accordance with one embodiment of the present invention.

FIG. 7 illustrates a hot-pluggable component during the process of connection with a system in accordance with one embodiment of the present invention. The component (700) is being inserted in the direction indicated by the direction arrow (710) into a housing unit (720) on a PCB (730). In this illustration the ground and power lines (740) are not connected to the ground and power connectors (750). Likewise, the signal lines (760) are not connected to the signal connectors (770).

The position and direction of movement of the component in FIG. 7 corresponds to step 500 of FIG. 5 where the component is connected to the system. If the direction arrow were reversed, the position and direction of movement of the component in FIG. 7 corresponds to step 640 of FIG. 6 where the component is disconnected from the system. By moving the component in the direction indicated by arrow 710, a configuration similar to the configuration shown in FIG. 8 is achieved.

Figure 8:
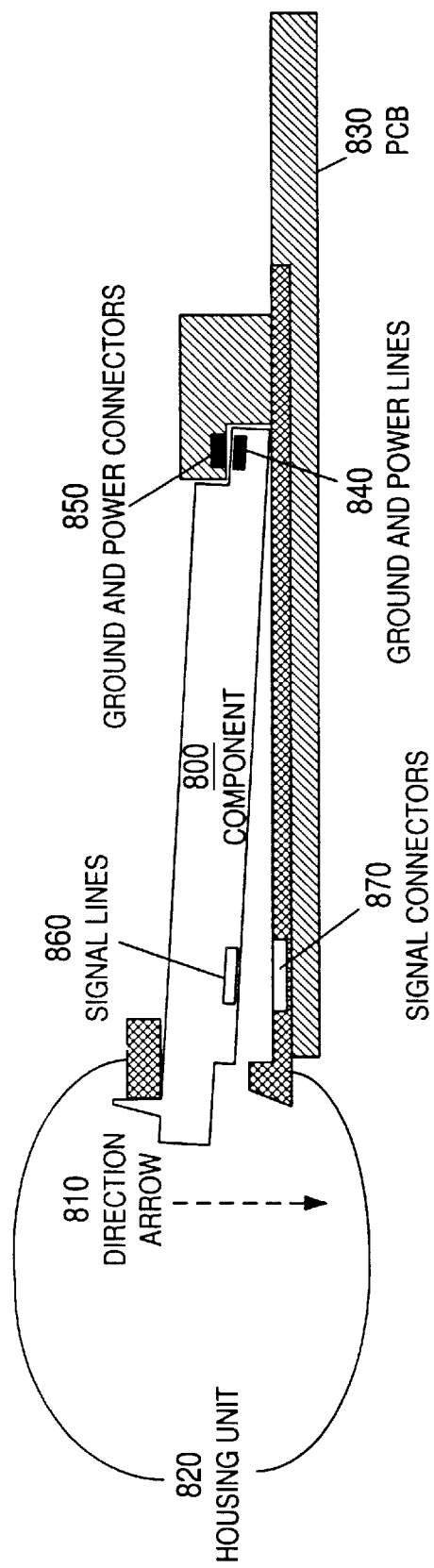
FIG. 8 is a block diagram of a hot-pluggable component in accordance with one embodiment of the present invention.

FIG. 8 illustrates a hot-pluggable component in accordance with one embodiment of the present invention. The component (800) is being inserted in the direction indicated by the direction arrow (810) into a housing unit (820) on a PCB (830). In this illustration the ground and power lines (840) are connected to the ground and power connectors (850). However, the signal lines (860) are not connected to the signal connectors (870).

The position and direction of movement of the component in FIG. 8 corresponds to step 530 of FIG. 5 where movement in a second direction completes the connection of the hot-pluggable component. If the direction arrow were reversed, the position and direction of movement of the component in FIG. 8 corresponds to step 610 of FIG. 6 where the signal lines are disconnected from the system. By moving the component in the direction indicated by arrow 810, a configuration similar to the configuration shown in FIG. 9 is achieved.

Figure 9:
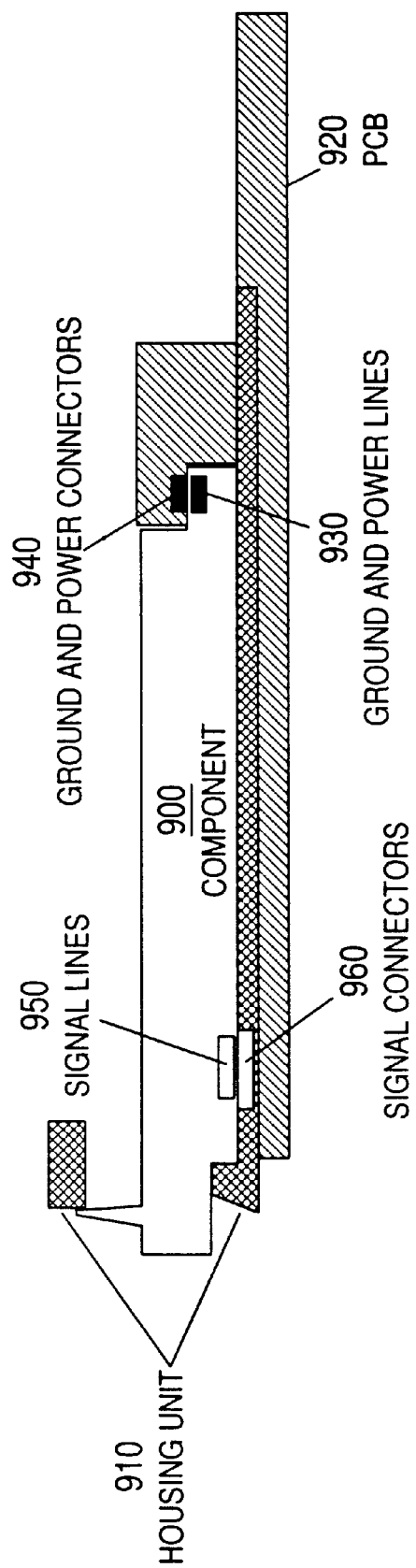
FIG. 9 is a block diagram of a hot-pluggable component in accordance with one embodiment of the present invention.

FIG. 9 illustrates a hot-pluggable component in accordance with one embodiment of the present invention. The component (900) is situated in a housing unit (910) on a PCB (920). In this illustration the ground and power lines (930) are connected to the ground and power connectors (940). Likewise, the signal lines (950) are connected to the signal connectors (960).

FIG. 9 is accomplished as a result of installing a component as shown in FIGS. 7 and 8 (i.e., it is inserted in a first direction, then it is inserted in a second direction). To remove the component, the process shown in FIGS. 7 and 8 is reversed. It begins in the state shown in FIG. 9. The component is then moved in the opposite of the direction indicated by arrow 810. Lastly, the component is moved in the opposite of the direction indicated by arrow 710 and the component is completely removed.

Front Pluggable Guidance System

In one embodiment, a guidance system causes a hot-pluggable component to move in a direction which couples, first, the ground line and, then, the power lines to the system. In one embodiment, the guidance system is a guide rail. After the ground and power lines are connected, the guide rail system causes the hot-pluggable component to move in another direction which couples the signal lines to the system.

Figure 10:
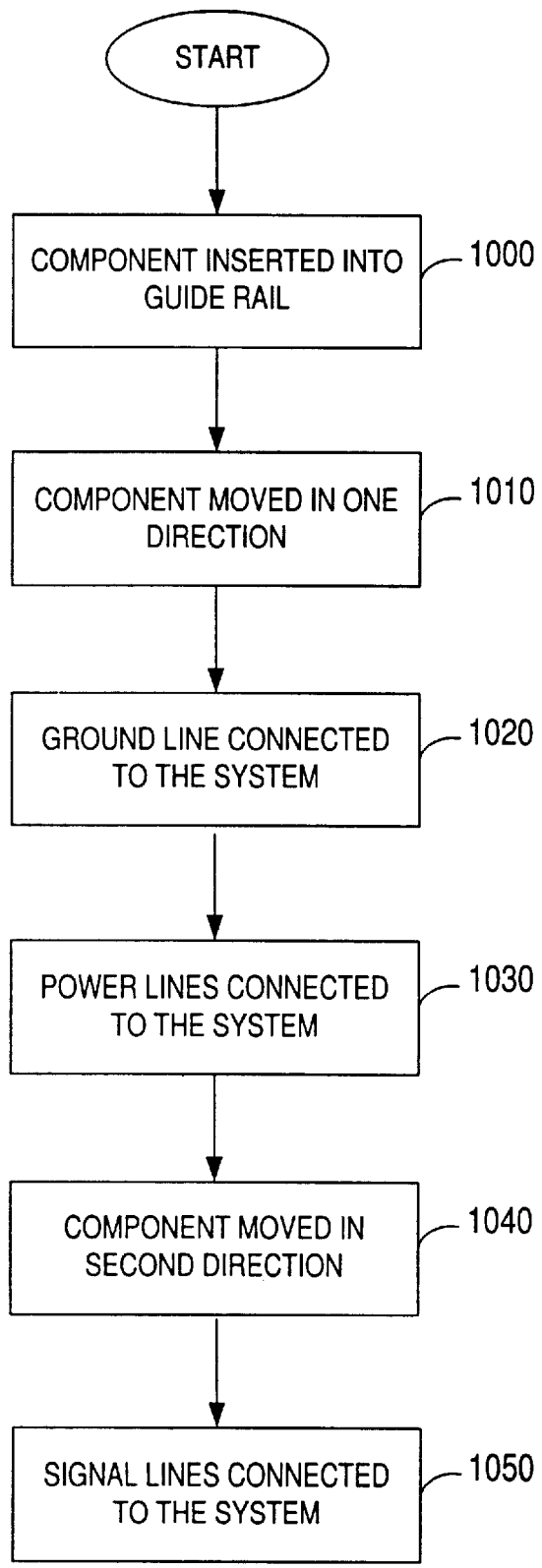
FIG. 10 is a flow diagram of the process of connecting a hot-pluggable component in accordance with one embodiment of the present invention.

FIG. 10 illustrates the process of connecting a hot-pluggable component in accordance with one embodiment of the present invention. At step 1000, the component is inserted into a guide rail. At step 1010, the component is moved in one direction in accordance with the guide rail. At step 1020, the ground line is connected to the system. At step 1030, the power lines are connected to the system. At step 1040, the component is moved in a second direction in accordance with the guide rail. At step 1050, the signal lines are connected to the system.

In another embodiment, a latching mechanism holds the component in place once the signal lines are connected to the system. In this embodiment, an ejection system releases the latching mechanism and allows removal of the component.

Figure 11:
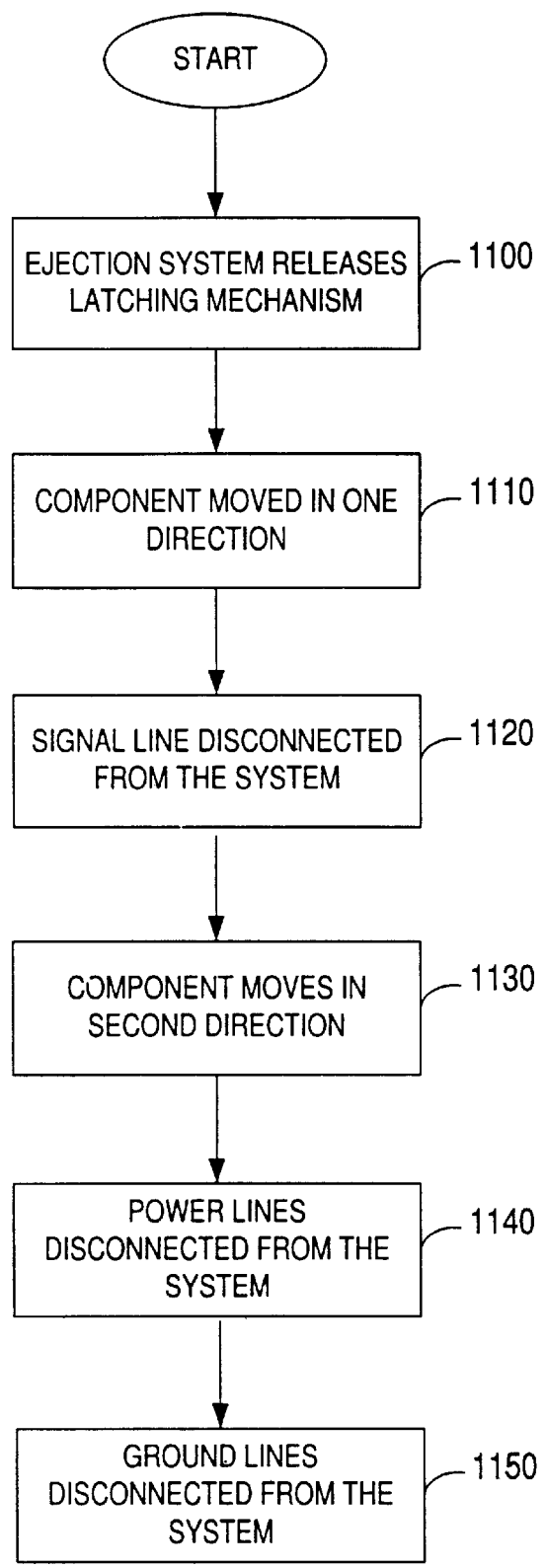
FIG. 11 is a flow diagram of the process of disconnection a hot-pluggable component in accordance with one embodiment of the present invention.

FIG. 11 illustrates the process of disconnection a hot-pluggable component in accordance with one embodiment of the present invention. At step 1100, an ejection system releases a latching mechanism. At step 1110, the component is moved in one direction. At step 1120, the signal lines are disconnected from the system. At step 1130, the component is moved in a second direction. At step 1140, the power lines are disconnected from the system. At step 1150, the ground line is disconnected from the system.

In one embodiment of the present invention, signal lines are connected to the system in the same plane as a PCB. In this embodiment, the area used for signal line connections is increased when more signal lines are present. Thus, signal lines are added without increasing space requirement of the component or decreasing the fault tolerance of signal line connections. In one embodiment of the present invention, the hot-pluggable component is an optical transceiver.

Housing Unit

Figure 12:
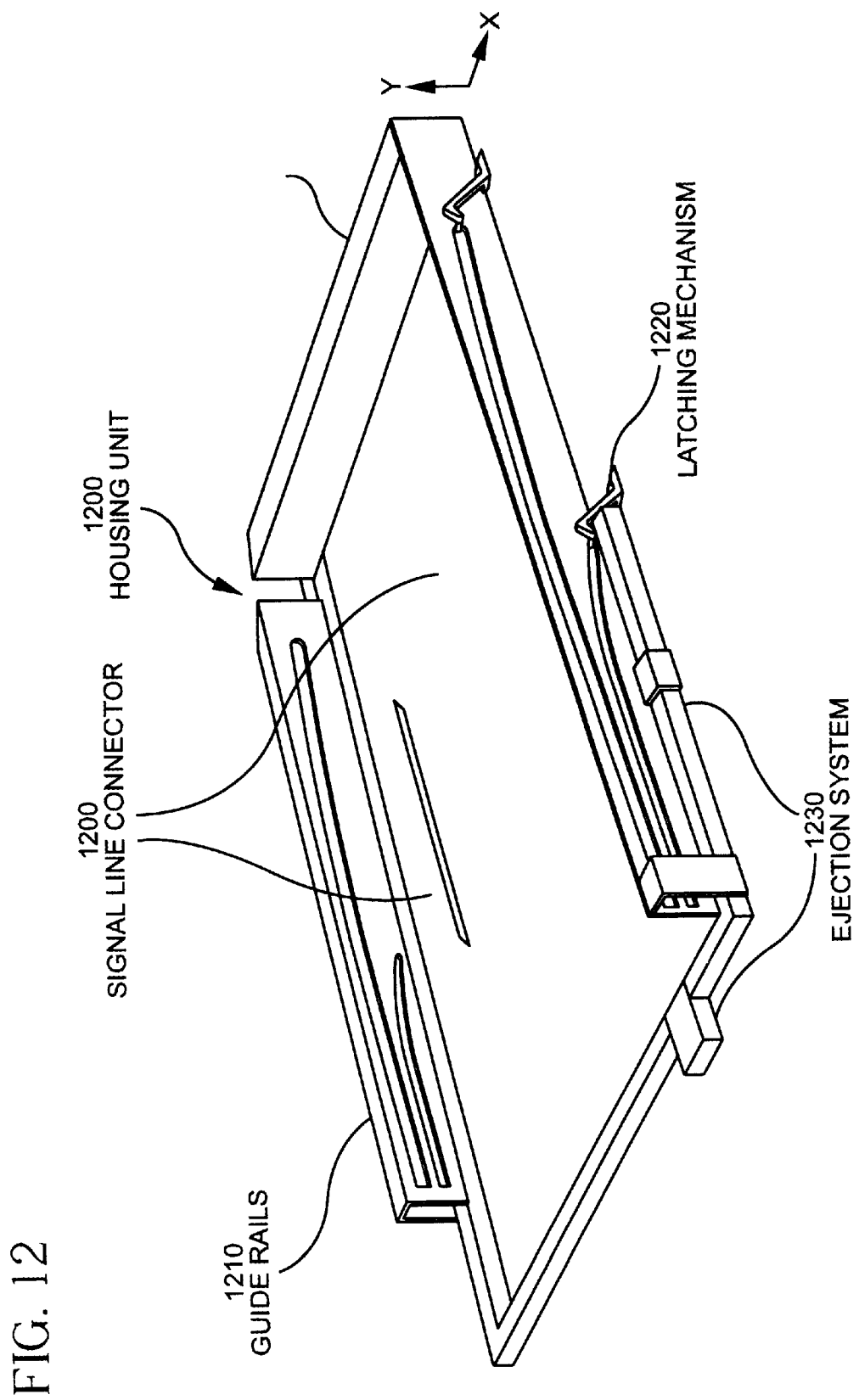
FIG. 12 is a block diagram of a housing unit in accordance with one embodiment of the present invention.

FIG. 12 illustrates a housing unit in accordance with one embodiment of the present invention. The housing unit (1200) is comprised of a set of guide rails (1210), a latching mechanism (1220), an ejection system (1230), a signal line connector (1240) and a power and ground line connector (1250).

Vertical Signal Path Connector

In one embodiment, the signal path connector uses an anisotropic conductive elastomer. Elastomer interconnects make electrical connections uniformly between opposing contact areas using conductive columns, which are regularly distributed or patterned to optimize impedance characteristics within a sheet of silicone rubber. Elastomer interconnects are custom formulated depending on the application's pad pitch and are characterized by excellent through-conductance and high in-plane isolation. Additionally, the material is formulated and manufactured to provide mechanical shock relief while maintaining mechanical stability over its service life. In another embodiment, the power line connection to the system is made using an anisotropic conductive elastomer. In yet another embodiment, the ground line connection to the system is made using an anisotropic conductive elastomer.

Figure 1:
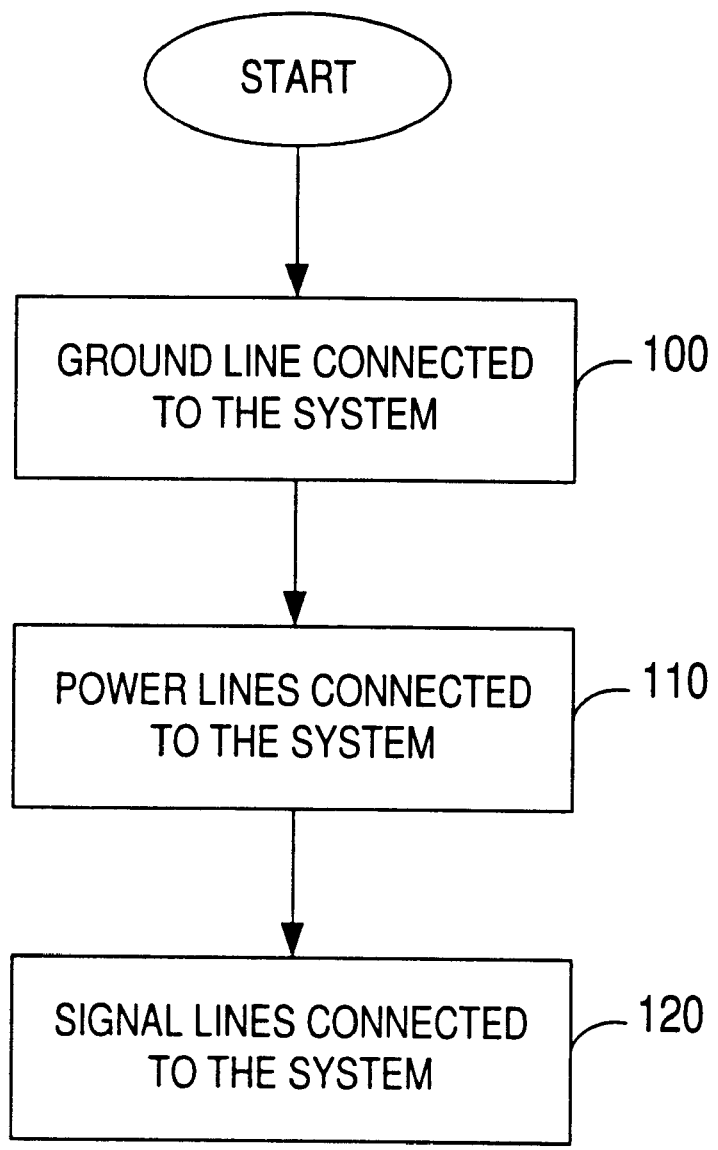
FIG. 1 is a flow diagram of the process of connecting a hot-pluggable component to a system.
Figure 2:
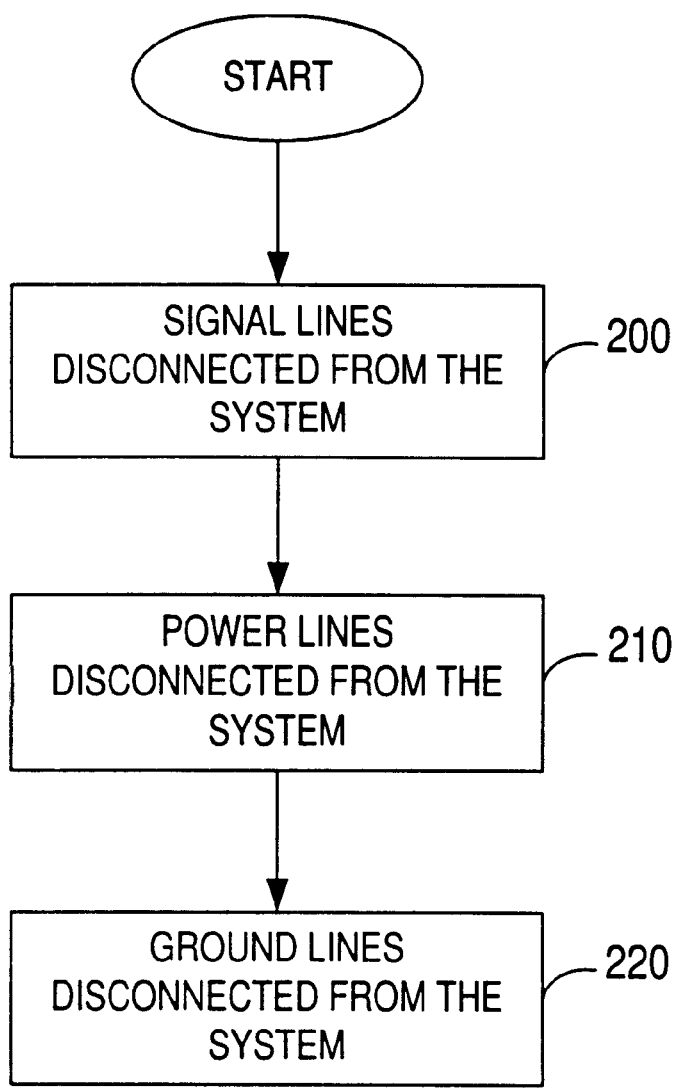
FIG. 2 is a flow diagram of the process of disconnecting a hot-pluggable component from a system.
Figure 3:
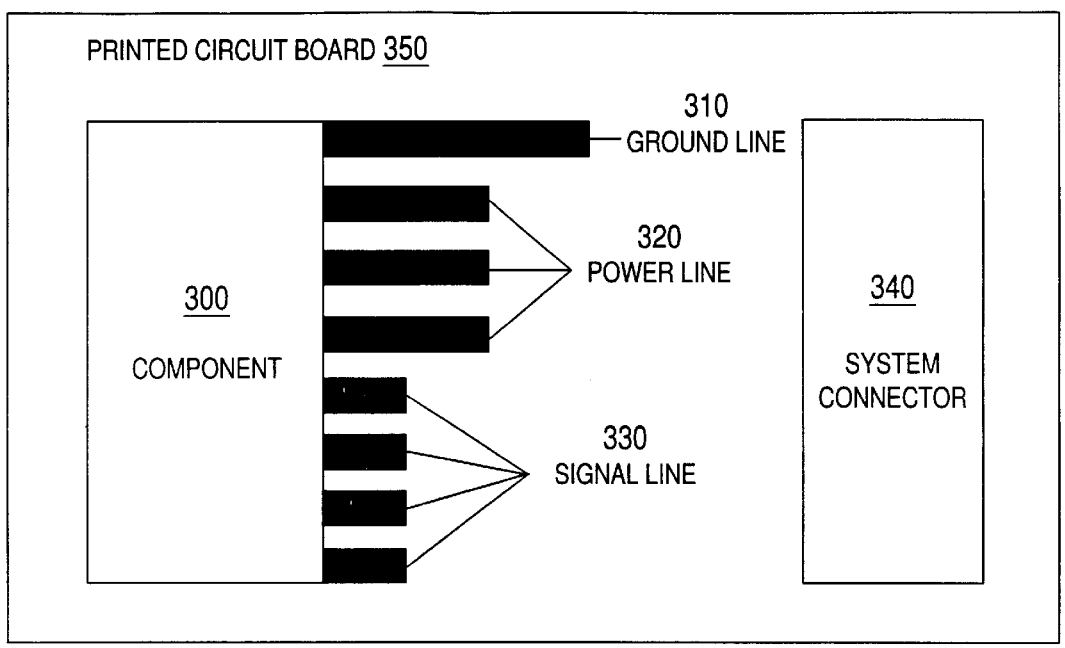
FIG. 3 is a block diagram of a prior art hot-pluggable component.
Figure 4:
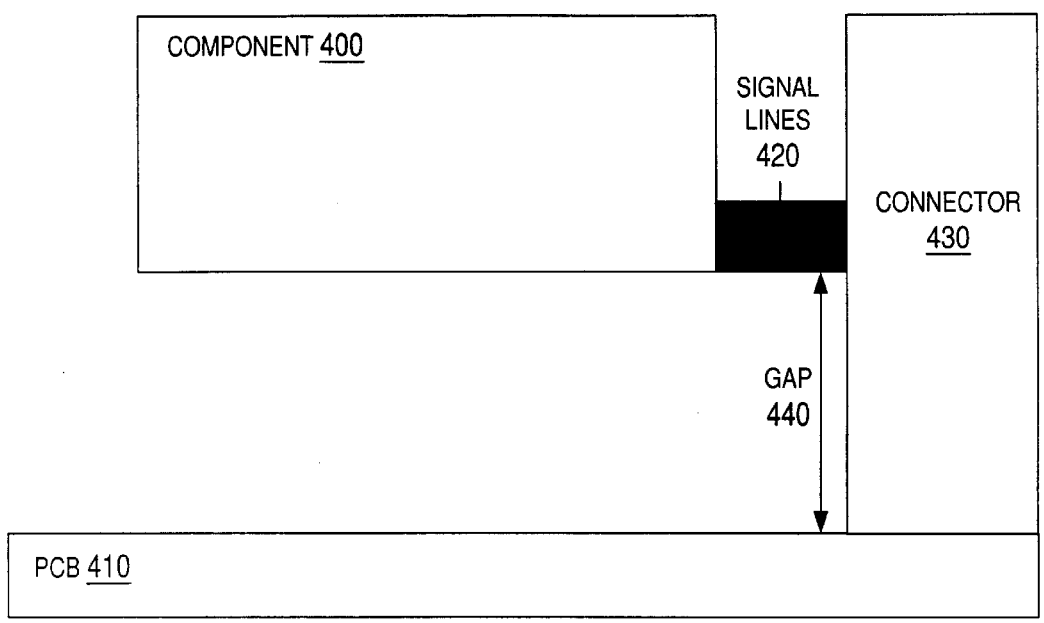
FIG. 4 is a block diagram of a prior art hot-pluggable component connected to an electronic system.
Figure 13:
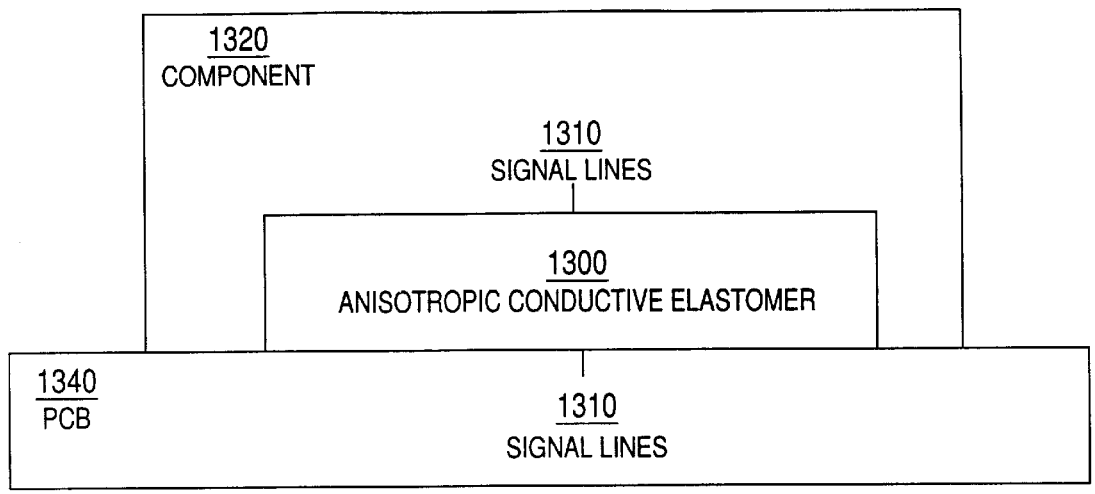
FIG. 13 is a block diagram of a connection between a component and a PCB using an anisotropic conductive elastomer in accordance with one embodiment of the present invention.

FIG. 13 illustrates a connection between a component and a PCB using an anisotropic conductive elastomer in accordance with one embodiment of the present invention. The anisotropic conductive elastomer (1300) is positioned between the connectors for the signal lines (1310) on the component (1320) and the connectors for the signal lines (1330) on the PCB (1340). The thickness of the anisotropic conductive elastomer is the only gap between the component signal lines and the PCB signal lines. Thus, the signal degradation and performance and loss of propagation speed associated with the gap (440) of FIG. 4 are minimized.

Figure 17:
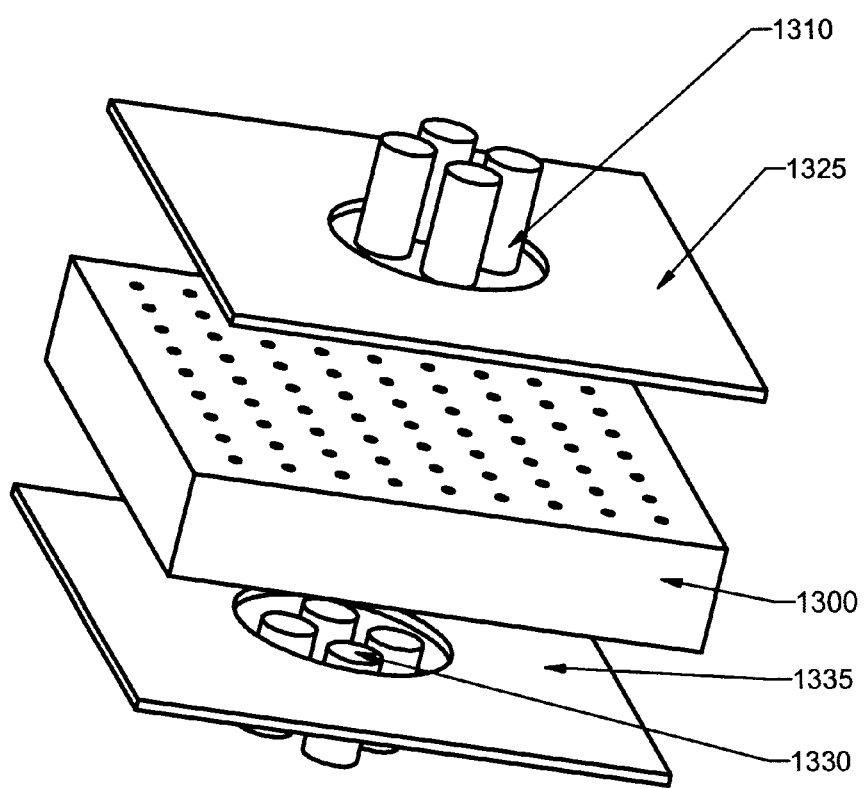
FIG. 17 illustrates an embodiment of the present invention having two sets of connectors circumscribed by two ground patterns.

FIG. 17 illustrates an embodiment of the present invention having two sets of connectors circumscribed by two ground patterns. An anisotropic conductive elastomer (1300) is positioned between the signal lines (1310/1330). The signal lines on a first side of the anisotropic conductive elastomer (1300) are circumscribed by a first ground pattern (1325) and the signal lines on a second side of the anisotropic conductive elastomer (1300) are circumscribed by a second ground pattern (1335).

In one embodiment, a ground pattern is etched into the component and the PCB circumscribing the signal line connections. This embodiment minimizes electromagnetic interference without increasing the dimensions of the component or the connector.

In one embodiment, high frequency, power and low speed logic lines are separated into a plurality of different location of the "hot-pluggable" device. The power supply and low speed logical are located in the periphery of the device. The high-speed frequency connections is made vertically from the below of the device. In this embodiment, the high frequency line connections are positioned over an anisotropic, conductive interposer such that the line connections are in electrical contact with the interposer. The interposer conducts electrical current in two directions along an axis through the interposer. An interface board also contacts the anisotropic, conductive interposer. The interface board has a plurality of electrical pads. The anisotropic, conductive interposer provides an electrical path to the pads on the interface board.

The anisotropic, compliant, conductive interposer material is comprised of an elastomeric sheet that includes a plurality of conductors. One anisotropic, compliant, conductive interposer material is a product named MT that is available from Shinetsu Polymer. However, it is apparent to one skilled in the art that other types and brands of anisotropic, compliant, conductive interposer material can be used.

One anisotropic, compliant, conductive interposer has an elastomeric material and a plurality of angled conductors. The angled conductors provide for reliable, resilient compression. The conductors are in a high-density matrix such that a large number of conductors connect each interface board contact to a corresponding device contact pad, thereby keeping the contact resistance and inductance through the interposer low. The elastomeric material is a silicone base that provides high compliance over a wide temperature range.

In one embodiment of the present invention, the contact matrix is very short and dense, which is an advantage for improved high frequency performance. In one embodiment, the contact distance is approximately 1 mm long. Because of the shortness of the contacts, the contacts introduce very little parasitic capacitance and inductance to a signal passing through the short leads. Thus, very few undesirable impedance effects are produced by the short leads. Because of the dense contact matrix, the interposer itself does not need alignment when it is located between the device and system. In another embodiment, the contact matrix is patterned, such that the impedance is optimized for high-frequency lines.

In one embodiment, interface boards are not planar or perfectly flat. The hot-pluggable device accommodates the non-planarity of the interface board and inter-connect solution attached to it by using an anisotropic, compliant, conductive interposer in the inter-connect. In another embodiment, part of the interposer acts as a ground shield. The ground shield part of the interposer prevents electro magnetic interference (EMI) in the environment. Additionally, it dissipates excessive heat generated inside the device itself to the interface board.

Figure 14:
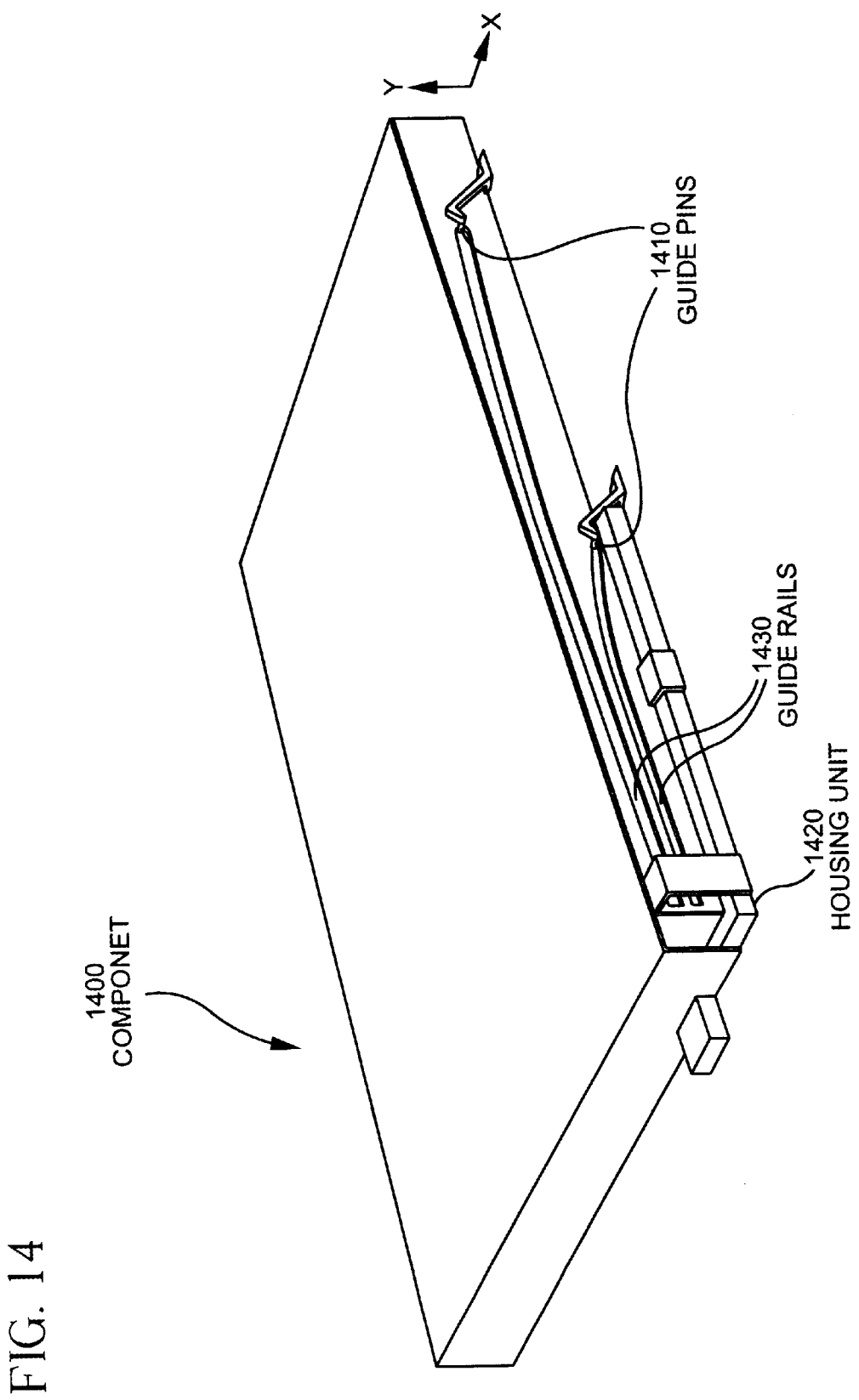
FIG. 14 is a block diagram of a hot-pluggable component situated in a housing unit in accordance with one embodiment of the present invention.

FIG. 14 illustrates a hot-pluggable component situated in a housing unit in accordance with one embodiment of the present invention. The component (1400) has guide pins (1410) which ensure the component moves properly through the housing unit's (1420) guide rails (1430).

Figure 15:
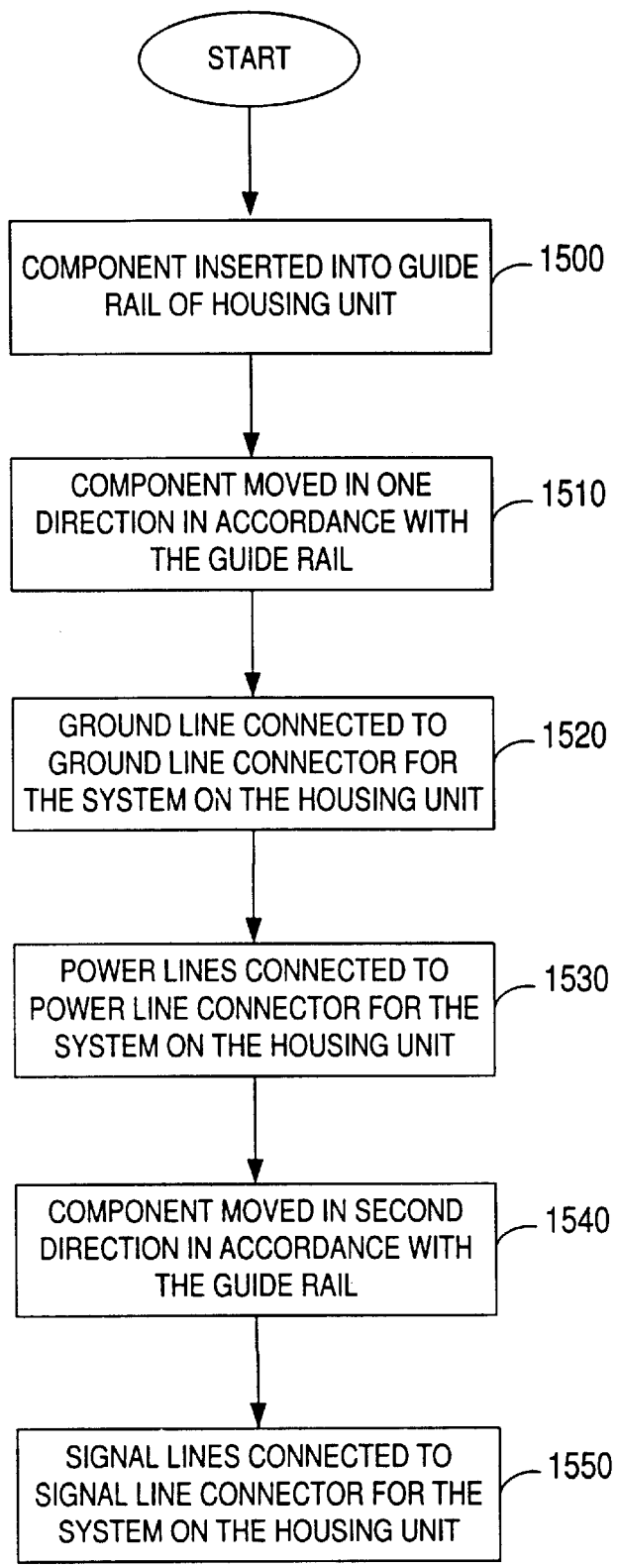
FIG. 15 is a flow diagram of the process of connecting a hot-pluggable component in accordance with one embodiment of the present invention.
Figure 16:
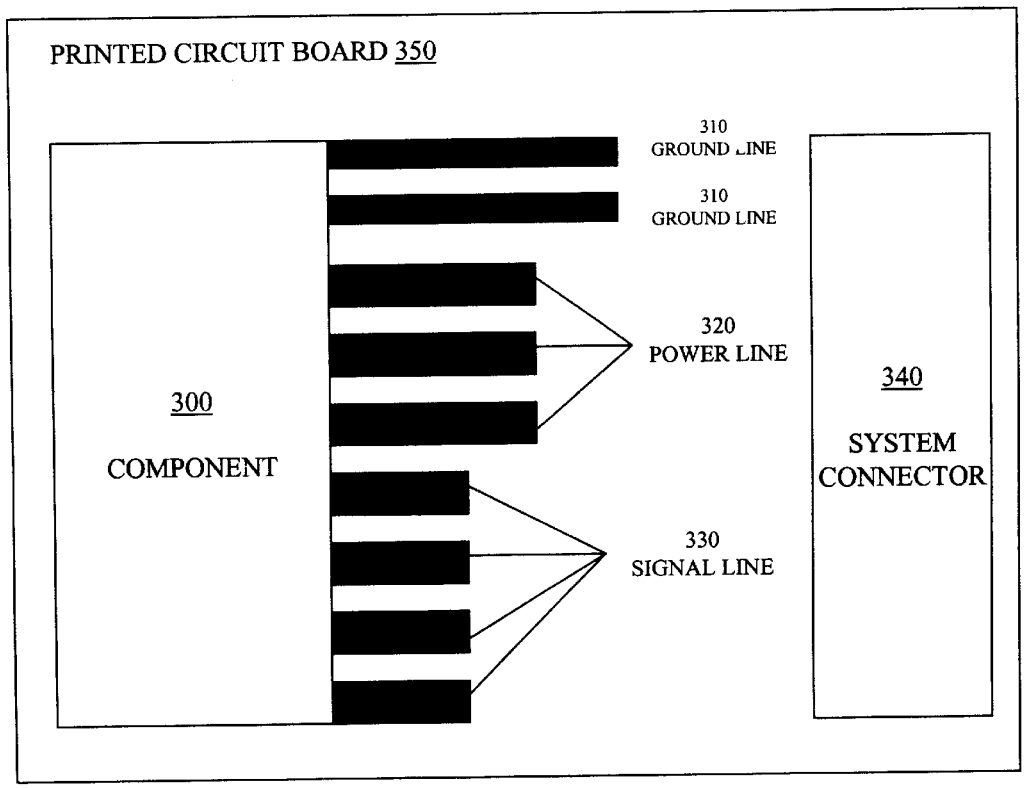
FIG. 16 is a block diagram of a hot-pluggable component in accordance to one embodiment of the present invention.

FIG. 15 illustrates the process of connecting a hot-pluggable optical transceiver in accordance with one embodiment of the present invention. At step 1500, the component is inserted into the guide rail of a housing unit. At step 1510, the component is moved in one direction in accordance with the guide rail. At step 1520, the ground line is connected to a ground line connector for the system on the housing unit. At step 1530, the power lines are connected to a power line connectors for the system on the housing unit. At step 1540, the component is moved in a second direction in accordance with the guide rail of the housing unit. At step 1550, the signal lines are connected to the signal line connectors for the system on the housing unit.

Another embodiment of the present invention has a second ground pattern wherein said second ground pattern circumscribes a second set of connectors of said connection wherein said connection connects said first set of connectors and said second set of connectors.

Thus, a method and apparatus for hot-pluggable electronic component connection is described in conjunction with one or more specific embodiments. The invention is defined by the following claims and their full scope and equivalents.

What is claimed is:

1. A method for connecting a component to an electronic system comprising:

connecting a ground line and a power line on said component to said electronic system by moving said component in a first direction wherein said power line is connected after said ground line is connected; and connecting a signal line on said component to said electronic system, using an anisotrop conductive interposer, by moving said component in a second direction wherein said signal line is connected after said power line is connected.

2. The method of claim 1 wherein said interposer is an elastomer.

3. A method of disconnecting a component from an electronic system comprising:

disconnecting a signal line on said component from said electronic system by moving said component in a first direction; and disconnecting a power line and a ground line on said component from said electronic system, using an anisotrop conductive interposer, by moving said component in a second direction wherein said power line is disconnected after said signal line is disconnected and said ground line is disconnected after said power line is disconnected.

4. The method of claim 3 wherein said interposer is an elastomer.

5. A method for connecting a component to an electronic system comprising:

making a connection using an anisotropic conductive interposer, and connecting a ground line, a power line and a signal line on said component to said electronic system wherein said power line is connected after said ground line is connected and said signal line is connected after said power line is connected.

6. The method of claim 5 wherein said interposer is an elastomer.

7. A component comprising:

a ground line on said component configured to connect to an electronic system when said component moves in a first direction;

a power line on said component configured to connect to an electronic system when said component moves in said first direction wherein said power line is connected after said ground line is connected; and a signal line on said component configured to connect to an electronic system when said component moves in a second direction wherein said signal line is connected after said power line is connected and said signal line is further configured to connect to said electronic system using an anisotropic conductive interposer.

8. The component of claim 7 wherein said interposer is an elastomer.

9. A component comprising:

a connection wherein said connection uses an anisotropic conductive interposer;

a ground line on said component configured to connect to an electronic system;

a power line on said component configured to connect to an electronic system wherein said ground line is connected before said power line; and a signal line on said component configured to connect to an electronic system wherein said power line is connected before said signal line.

10. The component of claim 9 wherein said interposer is an elastomer.

11. A method for connecting a first circuit carrier to an electronic system comprising:

connecting a ground line on said first circuit carrier to a second circuit carrier in said electronic system, connecting a power line on said first circuit carrier to said second circuit carrier, wherein said power line is connected after said ground line is connected, and connecting a signal line on said first circuit carrier to said second circuit carrier, wherein said signal line is connected after said power line is connected, wherein connection of said signal line is made using an anisotropic conductive interposer, wherein said first and second circuit carriers include at least one respective conductive layer of which at least one layer contains multidirectional electrically conductive lines.

12. The method according to claim 11, characterized by said interposer being an elastomer.

13. The method according to claim 11, characterized by said circuit carriers being one of a PCB, a silicon carrier or a ceramic carrier.

14. The method according to claim 11, characterized by a connection point is on a bottom side of said first circuit carrier wherein said connection point is a location where said signal line connects to said second circuit carrier and said bottom side is parallel to said second circuit carrier when said signal line is connected thereto.

15. A method for connecting a first circuit carrier to an electronic system comprising:

connecting a ground line on said first circuit carrier to a second circuit carrier in said electronic system, connecting a power line on said first circuit carrier to said second circuit carrier, wherein said power line is connected after said ground line is connected, and connecting a signal line on said first circuit carrier to said second circuit carrier, wherein said signal line is connected after said power line is connected, wherein connection of said signal line is made using an anisotropic conductive interposer, wherein said first and second circuit carriers include at least one respective conductive layer of which at least one layer contains multidirectional electrically conductive lines, said method further comprising providing a first ground pattern wherein said first ground pattern circumscribes a first set of connectors of said connection.

16. The method according to claim 15, characterized by:

providing a second ground pattern wherein said second ground pattern circumscribes a second set of connectors of said connection wherein said connection connects said first set of connectors and said second set of connectors.

17. The method according to claim 16, characterized by:

guiding said first circuit carrier so that it initially moves in a first direction and subsequently in a second direction.

18. The method according to claim 17, characterized by said first direction being substantially perpendicular to said second direction.

19. The method of claim 18 characterized by said step of guiding further comprises:

using a guide rail.

20. The method according to claim 19, characterized by using a latching mechanism to secure said first circuit carrier.

21. A method for connecting a first circuit carrier to an electronic system comprising:

connecting a ground line on said first circuit carrier to a second circuit carrier in said electronic system, connecting a power line on said first circuit carrier to said second circuit carrier, wherein said power line is connected after said ground line is connected, and connecting a signal line on said first circuit carrier to said second circuit carrier, wherein said signal line is connected after said power line is connected, wherein connection of said signal line is made using an anisotropic conductive interposer, wherein said first and second circuit carriers include at least one respective conductive layer of which at least one layer contains multidirectional electrically conductive lines, said first circuit carrier representing a part of an optical transceiver.

22. A method of disconnecting a first circuit carrier from an electronic system comprising:

disconnecting a signal line on said first circuit carrier from a second circuit carrier in said electronic system, disconnecting a power line on said first circuit carrier from said second circuit carrier, and disconnecting a ground line on said first circuit carrier from said second circuit carrier, wherein said power line is disconnected after said signal line is disconnected and said ground line is disconnected after said power line is disconnected, wherein said disconnection of said signal line is made using an anistropic conductive interposer, wherein said first and second circuit carriers include at least one respective conductive layer of which at least one layer contains multidirectional electrically conductive line.

23. The method according to claim 22, characterized by said interposer being an elastomer.

24. The method according to claim 22, characterized by:

guiding said first circuit carrier so that it initially moves in a first direction and subsequently in a second direction.

25. The method according to claim 24, characterized by said step of guiding further comprises:

using a guide rail.

26. The method according to claim 22, characterized by:
using an ejection system which unlatches mechanism to release said first circuit carrier.

27. The method according to claim 22, characterized by a disconnection point being located on a bottom side of said first circuit carrier, wherein said disconnection point being a location where said signal line disconnects from said second circuit carrier and said bottom side is parallel to said second circuit carrier when said signal line is disconnected therefrom.

28. The method according to claim 22, characterized by said circuit carriers being one of a PCB, a silicon carrier or a ceramic carrier.

29. A method of disconnecting a first circuit carrier from an electronic system comprising:
disconnecting a signal line on said first circuit carrier from a second circuit carrier in said electronic system,
disconnecting a power line on said first circuit carrier from said second circuit carrier, and
disconnecting a ground line on said first circuit carrier from said second circuit carrier, wherein said power line is disconnected after said signal line is disconnected and said ground line is disconnected after said power line is disconnected, wherein said disconnection of said signal line is made using an anisotropic conductive interposer, wherein said first and second circuit carriers include at least one respective conductive layer of which at least one layer contains multidirectional electrically conductive lines, said method further comprising guiding said first circuit carrier so that it initially moves in a first direction and subsequently in a second direction wherein said first direction is substantially perpendicular to said second direction.

30. A method of disconnecting a first circuit carrier from an electronic system comprising:
disconnecting a signal line on said first circuit carrier from a second circuit carrier in said electronic system,
disconnecting a power line on said first circuit carrier from said second circuit carrier, and
disconnecting a ground line on said first circuit carrier from said second circuit carrier, wherein said power line is disconnected after said signal line is disconnected and said ground line is disconnected after said power line is disconnected, wherein said disconnection of said signal line is made using an anisotropic conductive interposer, wherein said first and second circuit carriers include at least one respective conductive layer of which at least one layer contains multidirectional electrically conductive lines, wherein said first circuit carrier is a part of an optical transceiver.

31. A circuit carrier onto which at least one component is mounted comprising:
a ground line on said circuit carrier configured to connect to another circuit carrier in an electronic system,
a power line on said circuit carrier configured to connect to said other circuit carrier, wherein said power line is configured to be connected after said ground line is connected; and
a signal line on said circuit carrier configured to connect to said other circuit carrier, wherein said signal line is configured to be connected after said power line is connected, wherein said signal line is further configured to connect to said other circuit carrier using an anisotropic conductive interposer, wherein said first and second circuit carriers include at least one respective conductive layer of which at least one layer contains multidirectional electrically conductive lines.

32. The circuit carrier according to claim 31, characterized in that said interposer is an elastomer.

33. The circuit carrier according to claim 31, characterized in that it further comprises:
a guidance system, wherein said guidance system guides said circuit carrier so that it initially moves in a first direction and subsequently in a second direction.

34. The circuit carrier according to claim 31, characterized in that it further comprises:
a connection point on a bottom side of said circuit carrier wherein said connection point is a location where said signal line connects to said other circuit carrier and said bottom side is parallel to said other circuit carrier when said signal line is connected thereto.

35. The circuit carrier according to claim 31, characterized in that it is one of a PCB, a silicon carrier or a ceramic carrier.

36. The circuit carrier according to claim 33, characterized in that said guidance system comprises:
a guide rail.

37. The circuit carrier according to claim 31, characterized in that it further comprises:
a latching mechanism configured to secure it to said electronic system.

38. The circuit carrier according to claim 31, characterized in that said signal line is further configured to disconnect from said electronic system when it moves in a third direction wherein said third direction is opposite said second direction.

39. The circuit carrier according to claim 38, characterized in that said power line is further configured to disconnect from said electronic system when it moves in a fourth direction wherein said fourth direction is opposite said first direction and said power line disconnects after said signal line disconnects.

40. The circuit carrier according to claim 39, characterized in that said ground line is further configured to disconnect from said electronic system when it moves in said fourth direction wherein said ground line disconnects after said power line disconnects.

41. The circuit carrier of according to claim 37, characterized in that it further comprises:
an ejection system configured to release said latching mechanism.

42. A circuit carrier onto which at least one component is mounted comprising:
a ground line on said circuit carrier configured to connect to another circuit carrier in an electronic system,
a power line on said circuit carrier configured to connect to said other circuit carrier, wherein said power line is configured to be connected after said ground line is connected; and
a signal line on said circuit carrier configured to connect to said other circuit carrier, wherein said signal line is configured to be connected after said power line is connected, wherein said signal line is further configured to connect to said other circuit carrier using an anisotropic conductive interposer, wherein said first and second circuit carriers include at least one respective conductive layer of which at least one layer contains multidirectional electrically conductive lines, further comprises:
a first ground pattern wherein said first ground pattern circumscribes a first set of connectors of said connection.

43. The circuit carrier according to claim 42, characterized in that it further comprises:
a second ground pattern wherein said second ground pattern circumscribes a second set of connectors of said connection wherein said connection connects said first set of connectors and said second set of connectors.

44. A circuit carrier onto which at least one component is mounted comprising:
a ground line on said circuit carrier configured to connect to another circuit carrier in an electronic system,
a power line on said circuit carrier configured to connect to said other circuit carrier, wherein said power line is configured to be connected after said ground line is connected; and
a signal line on said circuit carrier configured to connect to said other circuit carrier, wherein said signal line is configured to be connected after said power line is connected, wherein said signal line is further configured to connect to said other circuit carrier using an anisotropic conductive interposer, wherein said first and second circuit carriers include at least one respective conductive layer of which at least one layer contains multidirectional electrically conductive lines., characterized in that it further comprises:
a guidance system, wherein said guidance system guides said circuit carrier so that it initially moves in a first direction and subsequently in a second direction wherein said first direction is substantially perpendicular to said second direction.

45. A circuit carrier onto which at least one component is mounted comprising:
a ground line on said circuit carrier configured to connect to another circuit carrier in an electronic system,
a power line on said circuit carrier configured to connect to said other circuit carrier, wherein said power line is configured to be connected after said ground line is connected; and
a signal line on said circuit carrier configured to connect to said other circuit carrier, wherein said signal line is configured to be connected after said power line is connected, wherein said signal line is further configured to connect to said other circuit carrier using an anisotropic conductive interposer, wherein said first and second circuit carriers include at least one respective conductive layer of which at least one layer contains multidirectional electrically conductive lines characterized in that it represents a part of an optical transceiver.

46. A method for connecting a component to an electronic system comprising:
connecting a ground line and a power line on said component to said electronic system by moving said component in a first direction wherein said power line is connected after said ground line is connected; and
connecting a signal line on said component to said electronic system by moving said component in a second direction, and first direction being substantially perpendicular to said second direction wherein said signal line is connected after said power line is connected.

47. A method of disconnecting a component from an electronic system comprising:
disconnecting a signal line on said component from said electronic system by moving said component in a first direction; and
disconnecting a power line and a ground line on said component from said electronic system by moving said component in a second direction, first direction being substantially perpendicular to said second direction, wherein said power line is disconnected after said signal line is disconnected and said ground line is disconnected after said power line is disconnected.

48. A component comprising:
a ground line on said component configured to connect to an electronic system when said component moves in a first direction;
a power line on said component configured to connect to an electronic system when said component moves in said first direction wherein said power line is connected after said ground line is connected; and
a signal line on said component configured to connect to an electronic system when said component moves in a second direction, said first direction being substantially perpendicular to said second direction wherein said signal line is connected after said power line is connected.

* * * * *